United States Patent
Seyanagi et al.

(10) Patent No.: US 7,098,255 B2
(45) Date of Patent: *Aug. 29, 2006

(54) PROCESS FOR PRODUCING POLYURETHANE FOAM

(75) Inventors: Hiroshi Seyanagi, Osaka (JP); Kaoru Inoue, Osaka (JP); Kazuyuki Ogawa, Osaka (JP); Takashi Masui, Ohtsu (JP); Koichi Ono, Ohtsu (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/881,756

(22) Filed: Jun. 30, 2004

(65) Prior Publication Data

US 2004/0242719 A1 Dec. 2, 2004

Related U.S. Application Data

(63) Continuation of application No. 10/111,738, filed as application No. PCT/JP01/04831 on Jun. 7, 2001, now Pat. No. 6,777,455.

(30) Foreign Application Priority Data

Jun. 13, 2000 (JP) ............................. 2000-176732

(51) Int. Cl.
*C08G 18/28* (2006.01)

(52) U.S. Cl. .................. 521/170; 438/631; 451/41; 451/287; 451/527; 521/110; 521/112; 521/128; 521/130; 521/131; 521/133; 521/137; 521/159; 521/174

(58) Field of Classification Search ................ 521/110, 521/112, 128, 130, 131, 133, 137, 159, 170, 521/174; 451/41, 287, 527; 438/631
See application file for complete search history.

(56) References Cited

U.S. PATENT DOCUMENTS 4,927,861 A * 5/1990 Souto et al. ................. 521/99
5,725,420 A * 3/1998 Torii .......................... 451/285
5,840,782 A 11/1998 Limerkens et al.
6,022,903 A * 2/2000 Younes et al. ............... 521/133
6,200,901 B1 * 3/2001 Hudson et al. .............. 438/697
6,410,608 B1 * 6/2002 Sakai et al. .................. 521/128
6,437,013 B1 * 8/2002 Kuwamura et al. .......... 521/174
6,777,455 B1 * 8/2004 Seyanagi et al. ............ 521/110
2005/0064709 A1 3/2005 Shimomura et al.

FOREIGN PATENT DOCUMENTS

| JP | 1-222868 | 9/1989 |
| JP | 2-138328 | 5/1990 |
| JP | 6-220151 | 8/1994 |
| JP | 8-12794 | 1/1996 |
| JP | 11-302355 | 11/1999 |
| JP | 2000-17252 A | 1/2000 |
| JP | 2000-178374 | 6/2000 |
| JP | 2000-178374 A | 6/2000 |
| JP | 2001-47355 A | 2/2001 |
| JP | 2001-176829 A | 6/2001 |
| JP | 2001-179608 A | 7/2001 |
| JP | 2001-277101 A | 10/2001 |
| JP | 2001-358101 A | 12/2001 |
| WO | WO 01/96434 A1 | 12/2001 |

* cited by examiner

Primary Examiner—John M. Cooney, Jr.
(74) Attorney, Agent, or Firm—Knobbe Martens Olsone & Bear, LLP

(57) ABSTRACT

A process for producing a finely cellular polyurethane foam by mixing a first ingredient comprising an isocyanate compound and a second ingredient comprising a compound containing an active hydrogen group, characterized by comprising adding a nonionic silicone surfactant containing no hydroxyl group to at least one of the first ingredient and the second ingredient in an amount of 0.1 to 5 wt %, excluding 5 wt %, based on the total amount of the first ingredient and the second ingredient, subsequently agitating the surfactant containing ingredient together with an unreactive gas, which has no reactivity to isocyanate group or active hydrogen group, to disperse the unreactive gas as fine bubbles to prepare a bubble dispersion and then mixing the bubble dispersion with the remaining ingredient to cure the resultant mixture and forming finely cellular structure into the resultant polyurethane foam by the fine bubbles of the bubble dispersion.

16 Claims, No Drawings

PROCESS FOR PRODUCING POLYURETHANE FOAM

CROSS-REFERENCE TO RELATED APPLICATION

This is a continuation application of U.S. patent application Ser. No. 10/111,738, filed Apr. 25, 2002 now U.S. Pat. No. 6,777,455 which is the U.S. National Phase under 35 U.S.C. §371 of International Application PCT/JP01/04831, filed on Jun. 7, 2001, which claims priority of Japanese Patent Application No. 2000-176732, filed Jun. 13, 2000. The disclosure of the United States patent application is herein incorporated by reference in its entirety.

BACKGROUND OF THE INVENTION

1. Field of the Invention

The present invention relates to a process for producing polyurethane foam having uniform fine cells. A polyurethane foam obtained by the process of the present invention may be suitably used as polishing materials for resins, glass, lens, rock crystals, and silicon for producing semiconductors, electronic substrates, optical substrates etc. Especially a polyurethane foam of the present invention, which is cut as necessary, is suitably used as polishing sheets for CMP.

2. Description of the Related Art

As technology for producing a polyurethane foam, a method in which adding organic solvents having low boiling point, such as fluorocarbons and methylene chloride, into an ingredient composition for foaming and dispersing, and then foaming by polymerization heat vaporization; a method in which adding water into a ingredient composition for foaming and dispersing, and then foaming with carbon dioxide gas generated by a reaction of isocyanate groups and water, are well known. In a foam obtained by these methods, diameter of foamed cells (diameter of cells) has a minimum of 100 μm as an average, it is difficult to obtain a foam having more finely and uniform cells.

Following methods are known as a process for producing a polyurethane foam that has fine cells.

(1) A method that after fine-particles soluble in a solvent are dispersed into polyurethane polymer and are molded into a predetermined form, the molded body is immersed in a solvent that dissolves the fine-particles but does not dissolve the polyurethane polymer, the fine-particles are removed by dissolving to obtain a porous polyurethane resin, that is, polyurethane foam.

(2) A method that finely hollow foamed materials are dispersed in an ingredient composition forming polyurethane.

However, in a case where the above-mentioned method (1) is used, since much amount solvent is required, and treatment for the solvent containing material forming fine-particles is indispensable, high cost naturally occurs. Moreover only open-celled foam may be obtained, the foam obtained may not be used for usage where rigidity is needed, usage is limited. Besides, there is also a problem that a dissolving process and a solvent drying process are also needed, and a long time is needed in order to prepare a very thick molded body.

On the other hand, in the method of (2), since a finely hollow foam has a strong tendency to be floated up in a polyurethane forming solution based on a difference of density, a uniform foam is difficult to be produced. Besides, the finely hollow foam is comparatively expensive, and further since the raw material of the finely hollow foam is remained in the foam, there is a possible problem of inducing damage on a cutting edge in the case where the foam is cut. And the hollows fine-particles are scattered easily and then great costs are needed for facilities of working environmental maintenance.

By the way, a polyurethane foam is applied as a polishing sheet for producing silicon for semiconductors and the like, and producing an electronic substrates. In polishing sheet, highly precise polishing properties are required based on higher density of a formed circuit. Depend on types of particles and size of particles that are contained in polishing slurry used in polishing, a hardness of polishing sheet (polyurethane foam) and the like needs to be matched to those characteristics. For example, ceria derived slurry has a larger particle size than silica derived slurry, and when ceria derived slurry is used as polishing slurry, higher hardness is needed than silica derived slurry.

An object of the present invention is to provide a process for producing a polyurethane foam that have uniform fine cells and higher hardness than ones having the same density can be produced without using a chemically reactive blowing agent such as water, vaporizable expandable blowing agent such as fluorocarbon, or other substance such as a finely particulate hollow foam or solvent soluble substance.

Furthermore, another object of the present invention is to provide a polishing sheet adapted to polishing slurry by using polyurethane foam obtained by the above-mentioned process.

SUMMARY OF THE INVENTION

The present inventors found that a polyurethane foam having uniform finely cellular structure and a hardness higher than other foams with same density might be obtained by adding a predetermined amount of surfactant into either of material liquids for producing polyurethane, a first ingredient comprising an isocyanate compound (polyisocyanate compound), or a second ingredient comprising compound containing an active hydrogen groups (so-called polyol compounds, chain extenders), and agitating the liquid strongly in the presence of unreactive gas to prepare a bubble dispersion containing fine bubbles with unreactive gas, and subsequently polymerizing the liquid by mixed with another ingredient of reaction. Thus the present invention was completed.

The present invention relates to a process for producing a finely cellular polyurethane foam by mixing a first ingredient comprising an isocyanate compound and a second ingredient comprising a compound containing an active hydrogen group, characterized by comprising adding a nonionic silicone surfactant containing no hydroxyl group to at least one of the first ingredient and the second ingredient in an amount of 0.1 to 5 wt %, excluding 5 wt %, based on the total amount of the first ingredient and the second ingredient, subsequently agitating the surfactant containing ingredient together with an unreactive gas to disperse the unreactive gas as fine bubbles to prepare a bubble dispersion and then mixing the bubble dispersion with the remaining ingredient to cure the resultant mixture.

The above-mentioned surfactant is a nonionic silicone surfactant containing no hydroxyl groups. A polyurethane foam having finely and uniform cells may be stably obtained without failing to physical properties of polyurethane by using this type of surfactant.

An amount of the above-mentioned surfactant added is preferably 0.1 to 5 wt %, excluding 5 wt %, to total amount of material ingredients that is the first ingredient and the second ingredient. If the amount is less than 0.1 wt %, the foam having fine cells may not be obtained. In the point of such a reason, the amount of the surfactant is preferably no less than 1 wt %. On the other hand, in case that the amount is not less than 5 wt %, since a number of cells in a finely cellular polyurethane foam is excessively increased, a polyurethane foam having higher hardness is difficult to be obtained. In the point of such a reason, the amount of a surfactant added is preferably less than 4 wt %.

An "unreactive gas" is a gas composed only gaseous ingredient containing no reactivity to isocyanate group or active hydrogen group at ordinary temperature. Besides, gas may be positively sent into the liquid and only automatically involved into the liquid through agitation. Moreover, the fine cells preferably have an average diameter of not more than 50 micrometers, more preferably not more than 40 micrometers. According to a process of the present invention, fine cells having about an average diameter of 10 micrometers may be produced. The diameter of cells may be set up and controlled by selecting and adjusting suitably conditions, such as a type and an amount added of surfactant to be used, agitation conditions, and viscosity of the materials to be used. A density of the foam obtained is preferably approximately 0.6 to 0.95, and a hardness of the foam (ASKER D) is preferably 30 to 60. Especially as a foam for polishing, the hardness is preferably 50 to 56.

Although varied with performance of an agitator used and with viscosity of a reaction material solution that forms a polyurethane foam, etc., agitation time is at least 30 seconds and, in order to prepare a stable bubble dispersions therein, preferably it is approximately 1 to 2 minutes. And as long as flowability is secured, agitation may be practicable. This agitation time is required to be longer than in a case where usual polyurethane foam is produced. A diameter of the cells may be adjusted based on producing conditions, such as a type of surfactant to be added, an amount added, and agitation time.

In the above-mentioned process of the finely cellular polyurethane foam of the present invention, it is preferable to further comprise passing the bubble dispersion through a sieve mesh. One ingredient that is bubble dispersion may be passed through a sieve mesh, or it may be passed after other ingredients are mixed.

Bigger bubbles formed during agitation are burst and disappeared by being passed through a sieve mesh, and it becomes possible to obtain a finely cellular polyurethane foam having cells with higher uniformity.

In the present invention, the above-mentioned first ingredient is an isocyanate prepolymer, and in order to obtain a polyurethane foam having outstanding physical properties and finely and uniform cells, it is especially preferable that the above-mentioned surfactant is added into the above-mentioned isocyanate prepolymer. An isocyanate prepolymer that has molecular weight of approximately 800 to 5000 is preferably excellent in workability, and physical properties and the like.

In a method that adding the surfactant into the isocyanate prepolymer containing isocyanate groups, and mixing, agitating with a unreactive gas as fine bubbles to prepare a bubble dispersion, then curing the g bubble dispersions by adding a compound containing active hydrogen as curing agent, the isocyanate group of the isocyanate prepolymer is preferably a compound containing isocanate groups originating in aliphatic isocyanate compounds.

An isocyanate group originating in aliphatic isocyanate compounds has a lower reactivity compared with an isocyanate group originating in aromatic isocyanate compounds. Therefore, it takes long time to cure and not to flow a reaction after the isocyanate compound is mixed with an active hydrogen compound. For this reason, there is an advantage that period of time required for dispersion, for a process in which the liquid is poured into a predetermined mold for molding, and for a process in which the bubble dispersions is passed through a sieve mesh are secured. An isocyanate group originating in aromatic polyisocyanate compounds may be coexistence in this isocyanate prepolymer.

Moreover, an aliphatic isocyanate compound is defined as an isocyanate compound whose isocyanate groups are not directly bonded to aromatic rings, and as a matter whether or not the isocyanate compound has aromatic rings.

The present invention relates to a polyurethane foam obtained by the process and further to a polishing sheet using the polyurethane foam. The sheet is characterized with grooves that demonstrate a function in which polishing waste and polishing agent are removed off from a contact surface between a face to be polished and a polishing sheet to the outside, and are prepared on a sheet surface. A sheet may be produced by a method where reaction ingredient may be poured into a metal mold equipped with the same cavity as a thickness of the sheet to be manufactured with the polyurethane foam, or a thick block-shaped foam produced may be cut into a shape with a predetermined thickness.

A thickness of the polishing sheet is 0.8 mm to 2.0 mm, and usually polishing sheets approximately 1.2 mm thick are used.

Although a form of groove is not especially limited, a cross section of rectangle, triangle, character U-shape, semicircle and the like may be illustrated, and the grooves preferably have a cross-section that permits passing through of fine particles. The grooves are arranged in a shape of concentric circles or of grids and the like on a sheet face. A depth of the groove is dependent on thickness of the sheet etc., and is approximately 0.4 to 0.8 mm.

Since a polishing sheet of the present invention has finely and uniform cells and has higher hardness compared with the polyurethane foam of same density, it is especially useful when ceria derived slurry having a comparatively larger particle size is used as polishing slurry.

DETAILED DESCRIPTION OF THE PREFERRED EMBODIMENT

Well known polyisocyanate compounds in the field of polyurethane may be used without any limitation as isocyanate compounds used for the present invention. Diisocyanate compounds and their derivatives, especially isocyanate prepolymers are preferably used, because outstanding physical properties are given to the finely cellular polyurethane foam obtained. As producing methods for polyurethane, a prepolymer method and a one-shot process are well known, and any one of these methods may be used in the present invention. In the present invention, as organic diisocyanates that may be used, following compounds may be specifically illustrated.

Aromatic diisocyanate compounds, -4,4'-diphenyl-methane diisocyanate, 2,4'-diphenylmethane diisocyanate, 2,4-tolylene diisocyanate, 2,6-tolylene diisocyanate, naphthalene diisocyanate, 1,4-phenylene diisocyanate, etc.

Aliphatic diisocyanate compounds, -aliphatic diisocyanates, such as, ethylene diisocyanate, 2,2,4-trimethyl hexamethylene diisocyanate, 1,6-hexamethylene diisocyanate (HDI); -alicyclic diisocyanates, such as, hydrogenated 4,4'-diphenylmethane diisocyanate (HMDI, tradename Hylene- W, product manufactured by Hulls AG), 1,4-cyclohexane diisocyanate (CHDI), isophorone diisocyanate (IPDI), hydrogenated m-xylylene diisocyanate (HXDI), norbornane diisocyanate etc. -xylylene diisocyanate (XDI), tetramethyl-xylylene diisocyanate (TMXDI), etc.

The above-mentioned compounds may be used independently or two or more of them may be used together in combination.

Besides the above-mentioned diisocyanate compounds, poly-functional polyisocyanate compounds that have three or more functional groups may also be used. As isocyanate compounds having poly-functionality, a series of diisocyanate adducts are marketed as Desmodul N (Beyer AG) and tradename Duranate (product made by Asahi Kasei Corporation). Since gelling will easily be caused if these poly-functional polyisocyanate compounds having three or more functional groups are used independently in preparation of prepolymer, they may be preferably used in a form of being added into diisocyanate compounds.

Isocyanate compounds suitably used as a first ingredient in the present invention is an isocyanate prepolymer that is a reactant of the above-mentioned isocyanate compounds and compounds containing active hydrogen groups. As such compounds containing active hydrogen groups, polyol compounds and chain extenders mentioned later may be used. They are isocyanate prepolymers that are oligomers having terminal NCO groups obtained by heating and reacting the above-mentioned compounds in an equivalent ratio NCO/H* of isocyanate groups (NCO) and active hydrogen groups (H*) of 1.6 to 2.6, preferably of 1.8 to 2.2. Commercially available isocyanate prepolymers may also be used suitably.

Isocyanate groups in the isocyanate prepolymer may be obtained using the above-mentioned aliphatic isocyanate compounds as at least one of prepolymer forming ingredients. As long as unreacted NCO groups that exist at terminal position are NCO groups originated in aliphatic isocyanate compounds, aromatic diisocyanates may be used as prepolymer synthesis ingredients.

Compounds containing active hydrogen groups used in the present invention are organic compounds having two or more active hydrogen atoms, and are usually compounds referred to as polyol compounds and chain extenders in the technical field of polyurethane.

Active hydrogen groups are functional groups containing hydrogen atoms reactive with isocyanate groups, and hydroxyl groups, primary or secondary amino groups, thiol groups (SH), etc. may be mentioned.

Polyol compounds are oligomers having approximately 500 to 10000 of molecular weight obtained by end group determination method, and the following examples may be specifically illustrated.

(1) Polyether Polyols

As polyether polyols, polyoxypropylene polyols obtained by adding propylene oxide to one kind or two kinds or more of polyhydric alcohols, such as ethylene glycol, diethylene glycol, propylene glycol, dipropylene glycol, glycerol, and trimethylol propane; polyoxyethylene polyols obtained by adding ethyleneoxide to one kind or two kinds or more of the above-mentioned polyhydric alcohols; polyols obtained by adding butylene oxide, styrene oxide, etc. to one kind or two kinds or more of the above-mentioned polyhydric alcohols; and polyoxytetramethylene polyols obtained by adding tetrahydrofuran by ring opening polymerization to the above-mentioned polyhydric alcohols may be mentioned. Copolymers in which two or more kinds of above-mentioned cyclic ethers are used may also be used.

(2) Polyester Polyols

As polyester polyols, condensation polymers obtained from one kind or two kinds or more of ethylene glycol, propylene glycol, butane diol, pentane diol, hexane diol, cyclohexane dimethanol, glycerol, trimethylol propane, pentaerythritol, or other low molecular weight polyhydric alcohols, and one kind or two kinds or more of glutaric acid, adipic acid, pimelic acid, suberic acid, sebacic acid, terephthalic acid, isophthalic acid, dimer acid, hydrogenated dimer acid or other low molecule dicarboxylic acids, or oligomer acid; and polyols obtained by ring opening polymerization cyclic esters, such as propiolactone, caprolactone, and valerolactone may be mentioned.

(3) Acrylic Polyols

As acrylic copolymers, having two or more hydroxyl groups in one molecule, comprising a copolymerized monomer, which is mono-ethylenic unsaturated monomers, example, hydroxy alkyl ester of acrylic acid, such as beta-hydroxyethyl acrylate, beta-hydroxypropyl acrylate, 3-hydroxypropyl acrylate, beta-hydroxy butyl acrylate, 4-hydroxybutyl acrylate, and beta-hydroxy pentyl acrylate; or similar hydroxy alkyl esters of methacrylic acid; furthermore, acrylic acid monoesters of polyhydric alcohols, such as glycerol and trimethylol propane; or similar methacrylic acid monoesters; N-methylol acrylamide or N-methylol methacryl amide, may be used.

Moreover, as acrylic polyols, telechelic acrylic polyols may also be used. The telechelic acrylic polyols are acrylic derived polymers containing hydroxyl groups from which the polymerization of the unsaturated monomer containing (meth)acrylic acid ester is carried out by an initiator containing organic peroxide under existence of an alcoholic compound and an organic sulfonic acid compound. As alcoholic compounds, aliphatic alcohols, such as methanol and ethanol or alicyclic alcohols are preferable, and if mono-functional alcohols are used as alcoholic compounds, substantially bi-functional acrylic derived polymers containing active hydrogen groups will be obtained, and if diols are used as alcoholic compounds, substantially tetra-functional acrylic derived polymers containing active hydrogen groups will be obtained.

(4) Other Polyols

In addition, phenol resin polyols, epoxy polyols, polybutadiene polyols, polyisoprene polyols, polyester-polyether polyols, polymer polyols in which polymers of acrylonitrile or styrene are dispersed or vinyl-addition, urea dispersed polyols, carbonate polyols, etc. may be used as polyols of the present invention. Moreover, polyol compounds that have active hydrogen groups of aromatic amino groups obtained by condensation of these polyol compounds with p-aminobenzoic acid may also be used.

As chain extenders among compounds containin active hydrogen groups in the present invention are compounds having not more than approximately 500 of molecular weight. Specifically, aliphatic derived low molecule glycols and triols that are represented by ethylene glycol, diethylene glycol, propylene glycol, 1,4-butanediol, trimethylol propane, etc.; aromatic diamines, such as methylene bis-o-chloro aniline (MOCA), dicyclohexyl methane-4,4'-diamine; and aromatic derived diols, such as 1,4-bis-hydroxy ethoxy benzene (Cureamine H1 (manufactured by Ihara Chemical Industry Co., Ltd.)), and m-xylylene diol (manufactured by Mitsubishi Gas Chemical Company, Inc,) may be used.

As unreactive gases used in order to form fine bubbles, gases that do not have combustibility are preferable, and, specifically, nitrogen, oxygen, carbon dioxide, rare gas, such as helium and argon, and mixed gas of the above-mentioned gases are illustrated. Especially, use of dried air from which moisture is removed is the most preferable in cost.

As nonionic silicone surfactants used in the present invention, surfactants that have a function of forming fine bubbles stable when agitated with the above-mentioned first or second ingredient in the presence of the unreactive gas may be used without any limitation.

Especially, surfactants that have good compatibility with polyol compounds and isocyanate prepolymers, that is used as foaming stabilizers in polyurethane technical field, and that do not have active hydrogen groups, such as hydroxyl groups reactive with isocyanate groups, as mentioned above may be used. Specifically, silicone foaming stabilizers SH-190, SH-192 (product made of Dow Corning Toray Silicone Co., Ltd.), L-5340 (Nippon Unicar Co., Ltd.), etc. are illustrated.

In the present invention, as agitating equipments that disperse unreactive gas into a first ingredient or a second ingredient in a shape of fine bubbles, well-known agitating equipments may be used without any limitation, and, specifically, homogenizer, dissolver, biaxial planetary type mixer (planetary mixer), etc. may be illustrated. Although a form of impellers of agitating equipments is not especially limited, in order obtain fine bubbles use of whipper type impeller is preferable.

Moreover, in the present invention, an agitation for preparing a bubble dispersions, and an agitation for adding remaining ingredients and mixing, are carried out. Especially in the second agitation, since agitation for forming bubbles is not required, an agitating equipment that does not involve larger bubbls is preferably used. As such an agitating equipment, a planetary type mixer is suitable. Moreover, even if the same agitating equipment is used as an agitating equipment for the first and the second agitation, no problem occurs, and it is also suitable that adjustment of agitation conditions, such as adjustment of a rotating speed of impellers if needed, is carried out.

Although conditions for producing bubble dispersion therein are not especially limited, as long as fine bubbles are formed and a cured product with predetermined form is obtained. Temperature is necessarily no less than melting point of the first ingredient and the second ingredient and no more than a temperature at which a curing between isocyanate groups and active hydrogen groups does not advance rapidly. And it is preferably 0 degrees C. to 140 degrees C., and more preferably 10 degrees C. to 120 degrees C. Moreover, curing between isocyanate groups and active hydrogen groups is an exothermic reaction, and a different level of heat generation may be demonstrated according to types or combinations of isocyanate compounds and active hydrogen compounds selected. When a temperature rise of a system by heat of reaction is large, bubbles might be undesirably expanded in bubble dispersion therein. In such a case, it is preferable that a reaction system emitting little heat of reaction is adopted, or it is preferable that sufficient temperature control is carried out when a reaction system is adopted that emits a large amount of heat of reaction.

In the process of a polyurethane foam of the present invention, it is very suitable that a foam, which have reacted until fluidity is lost after a bubble dispersions therein is poured into a mold, is heated and post cured in order to expect an effect improving physical properties of the foam. A condition is also preferable in which bubble dispersion is poured into a metal mold, and a post cure is immediately carried out in heated oven. Since heat is not immediately transmitted to the reaction ingredients under such a condition, a diameter of cells does not become larger. In order to stabilize cellular form, it is preferable to carry out a curing reaction at atmospheric pressure. Moreover, in the present invention, catalysts that promote polyurethane reactions may be used. Type of catalysts and an amount added are selected suitably.

In the process of a finely cellular polyurethane foam of the present invention, both of a batch production system in which each ingredient is measured, introduced and agitated in a container, and a continuous production system in which each ingredient and an unreactive gas are continuously supplied to an agitating equipment and agitated, and subsequently an obtained bubble dispersion is sent out to produce a molded body may be adopted.

Since a sieve mesh used in the present invention should just remove comparatively big bubbles in a bubble (dispersion therein, a sieve mesh finer than 80 meshes is suitably used in order to obtain a foam with diameter of bubble of no more than 50 micrometers. In the case of a continuous production system, it is suitable to be installed in strainer type in a producing system.

In the present invention, other ingredients may be added into polyurethane forming materials. Specifically, fillers, such as resin fine powders and inorganic fine powders, catalysts or retarders for adjusting a curing rate of reaction, colorants, such as coloring matters and pigments, etc. may be illustrated.

EXAMPLES

Hereinafter, the example of a present invention will be described.

Example 1

Silicone foaming stabilizer SH-192 1 g (product made of Dow Corning Toray Silicone Co., Ltd.) was added as a surfactant into Adiprene L-325 (isocyanate terminated prepolymer, NCO=9.25%, manufactured by Uniroyal Chemical Co.,) melted and adjusted to 70 degrees C. of temperature (first ingredient) 100 g. The mixture obtained was agitated by a foaming mixer (impeller rotational frequency=3500 rpm), for approximately one minute and 50 seconds until it became cream-like (a state of meringue) to obtain a bubble dispersion. This bubble dispersion was transferred to a planetary type mixer, and Cureamine MT (methylene bis-o-chloroaniline, manufactured by Ihara Chemical Industry Co., Ltd.) (second ingredient) 26.2 g that was melted and kept at 120 degree C. was introduced into the mixer. Then the mixture was mixed for approximately one minute and 10 seconds. This mixed liquor was injected into an open mold within a working life while flowability was maintained, and was cured. Subsequently, post cure was carried out for 10 to 12 hours in an oven in which temperature was controlled to 80 to 85 degrees C., and a finely cellular polyurethane foam was produced. Used surfactant was 0.79 wt % to a total amount of the first ingredient and the second ingredient.

The obtained finely cellular polyurethane foam had uniform cells with density of 0.8 $g/cm^3$, hardness (ASKER D) of 56, and diameter of cell of 30 to 40 micrometers.

Examples 2 to 5

The same method as Example 1 was repeated, and finely cellular polyurethane foams were produced, except that the amount of silicone foaming stabilizer SH-192 used as a surfactant in Example 1 was changed as shown in Table 1. The density, hardness, and diameter of cells of finely cellular polyurethane foam obtained are shown in Table 1.

Example 6

The same method as Example 1 was repeated, and a finely cellular polyurethane foam was produced except that isocyanate terminated prepolymer (NCO=9.06%) 100 g, which is obtained by reacting tolylene diisocyanate (mixture of 2,4-isomer/2,6-isomer=80/20, abbreviated to TDI hereinafter) 32.52 parts by weight, hydrogenated 4,4'-diphenylmethane diisocyanate (abbreviated to HMDI hereinafter) 16.28 parts by weight, polytetramethylene glycol (abbreviated to PTMG hereinafter) having 645 of number average molecular weight 45.12 parts by weight and diethylene glycol (abbreviated to DEG hereinafter) 7.40 parts by weight, was used instead of Adiprene L-325 (isocyanate terminated prepolymer) 100 g and that the amount of silicone foaming stabilizer SH-192 used was changed into 4 g. The density, hardness, and diameter of cells of the finely cellular polyurethane foam obtained are shown in Table 1.

Example 7

The same method as Example 1 was repeated, and a finely cellular polyurethane foam was produced except that isocyanate terminated prepolymer (NCO=9.11%) 100 g, which is obtained by reacting TDI 31.32 parts by weight, HMDI 15.75 parts by weight, PTMG 52.62 parts by weight having 844 of number average molecular weight and DEG 6.62 parts by weight, was used instead of Adiprene L-325 (isocyanate terminated prepolymer) 100 g and that the amount of silicone foaming stabilizer SH-192 used was chanted into 4 g. The density, hardness, and diameter of cells of the finely cellular polyurethane foam obtained are shown in Table 1.

Comparative Example 1

Except having not added silicone foaming stabilizer SH-192 used as a surfactant in Example 1, the same method as Example 1 was repeated, and a finely cellular polyurethane foam was produced. The density, hardness, and diameter of cells of the finely cellular polyurethane foam obtained are shown in Table 1.

The obtained finely cellular polyurethane foam was heated at approximately 50 degrees C. and sliced with a slicer (VGW-T25 by AMITEC Corporation) by 1.27 mm in thickness to obtain a polishing sheet. Concentric circle-like grooves were prepared on a surface of the obtained polishing sheet, double-faced pressure sensitive adhesive tape (Double Tack tape #5782 manufactured by SEKISUI CHEMICAL CO., LTD.) was adhered onto a backside, and a polishing pad was obtained. Evaluation of polishing properties of the obtained polishing pad was carried out using CMP polishing equipment (SPP-600 S by Okamoto Machine Tool Works. Ltd.) A ceria slurry (ceria sol by NISSAN CHEMICAL INDUSTRIES, LTD.) adjusted to pH8 was passed by a flow rate of 150 g/minite, and polishing was carried out under a condition of polishing load 200 g/cm$^2$, polishing pad rotational frequency of 35 rpm, and wafer rotational frequency of 33 rpm.

Following items were evaluated as polishing properties. Evaluation results of each polishing property are shown in Table 1.

(Planarity)

After a thermal oxidation film was deposited with 0.5 micrometers on a 6-inch silicon wafer, patterning of L/S (line-and-space)=25 micrometers/5 micrometers, and of L/S=5 micrometers/25 micrometers were prepared. Furthermore, an oxide film (TEOS) was deposited with 1 micrometer, and a wafer with a pattern with an initial level difference of 0.5 micrometers was produced. Polishing was performed to this wafer under the above-mentioned polishing conditions, and an amount removed in a bottom of 25-micrometer space was measured when a global difference in level was no more than 2000 angstrom to obtain planarity. If a value of planarity is small, it means that the planarity is excellent.

(Uniformity Within a Surface)

A thermal oxidation film was deposited with 1 micrometer on a 6-inch silicon wafer, and under the above-mentioned polishing conditions, polishing was carried out until the thermal oxidation film wase 0.5 micrometers of thickness, and subsequently film thickness within a surface of the wafer was measured at 28 points. Uniformity within the surface was calculated by a following expression. If a value of uniformity within a surface is small, it means that the uniformity is excellent.

Uniformity within a surface (%)={(maximum film thickness−minimum film thickness)/(2×average film thickness)}×100

(Average Polishing Velocity)

A thermal oxidation film was deposited with 1 micrometer on a 6-inch silicon wafer, and under the above-mentioned polishing conditions, polishing was carried out until the thermal oxidation film was 0.5 micrometers of thickness. Average polishing velocity was obtained from polishing time needed for polishing. If a value of average polishing velocity is larger, it means that polishing property is excellent.

TABLE 1

|  |  | Comparative example1 | Example 1 | Example 2 | Example 3 | Example 4 | Example 5 | Example 6 | Example 7 |
|---|---|---|---|---|---|---|---|---|---|
| Surfactant | Amount added (g) | 0 | 1 | 2 | 3 | 4 | 5 | 4 | 4 |
|  | Wt % (to: the first ingredient + the second ingredient) | 0 | 0.79 | 1.58 | 2.38 | 3.17 | 3.96 | 3.17 | 3.17 |
| Properties of foam | Density (g/cm$^3$) | 0.8 | 0.8 | 0.8 | 0.8 | 0.8 | 0.8 | 0.7 | 0.7 |
|  | Hardness (ASKER D) | 51 | 56 | 55 | 55 | 53 | 52 | 56 | 55 |
|  | Diameter of cell (micrometer) | 50 to 100 | 30 to 40 | 30 to 40 | 30 to 40 | 30 to 40 | 30 to 40 | 30 to 40 | 30 to 40 |

TABLE 1-continued

|  |  | Comparative example1 | Example 1 | Example 2 | Example 3 | Example 4 | Example 5 | Example 6 | Example 7 |
|---|---|---|---|---|---|---|---|---|---|
| Polishing properties | Planarity (A) | 1250 | 750 | 850 | 900 | 1000 | 1000 | 700 | 750 |
|  | Uniformity within a surface (%) | 6.5 | 5.0 | 4.5 | 4.5 | 4.0 | 4.0 | 5.0 | 4.5 |
|  | Average polishing velocity (A/finely) | 2250 | 2600 | 2700 | 2700 | 2850 | 2900 | 2600 | 2600 |

The present invention is useful as a porcess of a polyurethane foam having uniform fine cells. A polyurethane foam obtained may be suitably used as polishing materials for resins, glass, lens, rock crystal, and silicon for producing semiconductors, electronic substrates, optical substrates etc. Especially polyurethane foam of the present invention, which is cut as necessary, is suitably used as polishing sheets for CMP. Therefore, the present invention has a high industrial applicability.

What is claimed is:

1. A polishing sheet configured to polish a semiconductor wafer and having a thickness of 0.8 mm to 2.0 mm, comprising a cellular polyurethane foam having an average cell diameter of 50 μm or less, a density of about 0.6 to about 0.95 g/cm³, and an Asker D hardness of 30 to 60, said foam being formed by preparing a first ingredient comprising an aliphatic isocyanate compound and a second ingredient comprising, as a compound containing an active hydrogen group, methylene bis-o-chloro aniline and/or dicyclohexyl methane-4,4'-diamine; adding a nonionic silicone surfactant containing no hydroxyl group to at least one of said first ingredient or said second ingredient in an amount of not less than 0.1 wt. % but less than 5 wt. %, relative to the total amount of said first ingredient and said second ingredient; agitating the ingredient(s) in which said surfactant has been added, together with an unreactive gas which has no reactivity to an isocyanate group or active hydrogen group, thereby dispersing said unreactive gas as fine bubbles into said ingredient(s) containing said surfactant to produce a bubble dispersion; mixing said bubble dispersion with the remaining ingredient if any; and curing the resultant mixture wherein said first ingredient and said second ingredient react.

2. The polishing sheet according to claim 1, wherein said foam has an average cell diameter of 10 to 40 μm.

3. The polishing sheet according to claim 1, wherein said foam has an Asker D hardness of 50 to 56.

4. The polishing sheet according to claim 1, wherein said sheet has a thickness of about 1.2 mm.

5. The polishing sheet according to claim 1, wherein said sheet has a groove provided on its surface.

6. The polishing sheet according to claim 5, wherein said groove has a depth of 0.4 mm to 0.8 mm.

7. The polishing sheet according to claim 1, which is in contact with a semiconductor wafer.

8. A polishing sheet configured to polish a semiconductor wafer and having a thickness of 0.8 mm to 2.0 mm, comprising a cellular polyurethane foam having an average cell diameter of 50 μm or less, a density of about 0.6 to about 0.95 g/cm³, and an Asker D hardness of 30 to 60, said foam comprising a cured mixture of (i) a first ingredient comprising an aliphatic isocyanate compound, (ii) a second ingredient comprising, as a compound containing an active hydrogen group, methylene bis-o-chloro aniline and/or dicyclohexyl methane-4,4'-diamine, (iii) a nonionic silicone surfactant containing no hydroxyl group added to at least one of said first ingredient or said second ingredient in an amount of not less than 0.1 wt. % but less than 5 wt. % relative to the total amount of said first ingredient and said second ingredient, and (iv) an unreactive gas having no reactivity to an isocyanate group or active hydrogen group, dispersed as fine bubbles in mixture containing ingredients (i) through (iii).

9. The polishing sheet according to claim 8, wherein said foam has an average cell diameter of 10 to 40 μm.

10. The polishing sheet according to claim 9, wherein said foam has an Asker D hardness of 50 to 56.

11. The polishing sheet according to claim 8, wherein said sheet has a groove having a depth of 0.4 mm to 0.8 mm provided on its surface.

12. The polishing sheet according to claim 8, which is in contact with a semiconductor wafer.

13. A method of polishing a semiconductor wafer comprising polishing a semiconductor wafer with the polishing sheet of claim 1.

14. A method of polishing a semiconductor wafer comprising polishing a semiconductor wafer with the polishing sheet of claim 8.

15. The polishing sheet according to claim 1, which comprises no chemically-reactive blowing agent.

16. The polishing sheet according to claim 8, which comprises no chemically-reactive blowing agent.

* * * * *